No. 721,773. PATENTED MAR. 3, 1903.
E. W. BEEBE.
OPTICAL APPARATUS.
APPLICATION FILED MAR. 14, 1901.
NO MODEL.
2 SHEETS—SHEET 1.
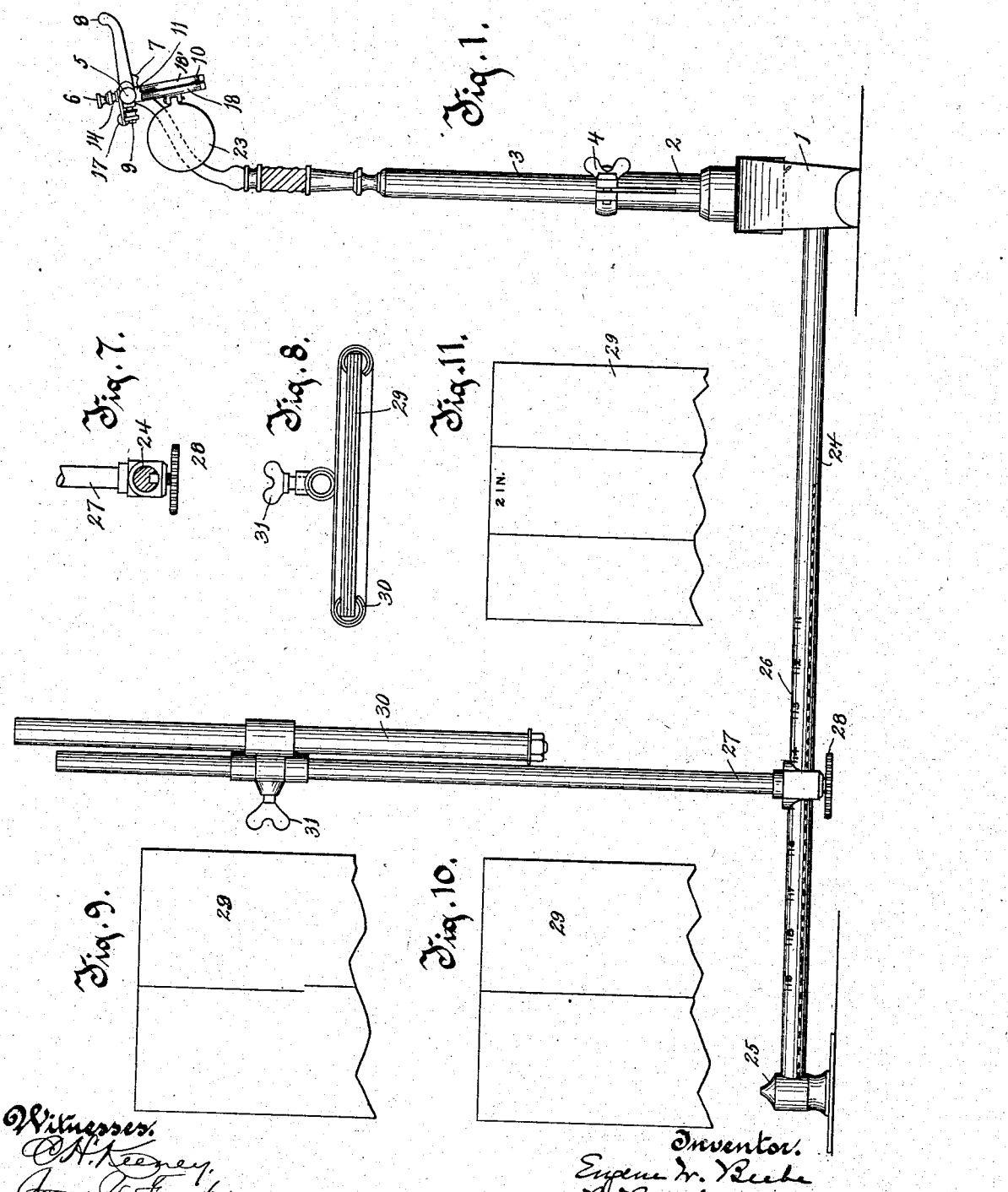

No. 721,773. PATENTED MAR. 3, 1903.
E. W. BEEBE.
OPTICAL APPARATUS.
APPLICATION FILED MAR. 14, 1901.
NO MODEL. 2 SHEETS—SHEET 2.
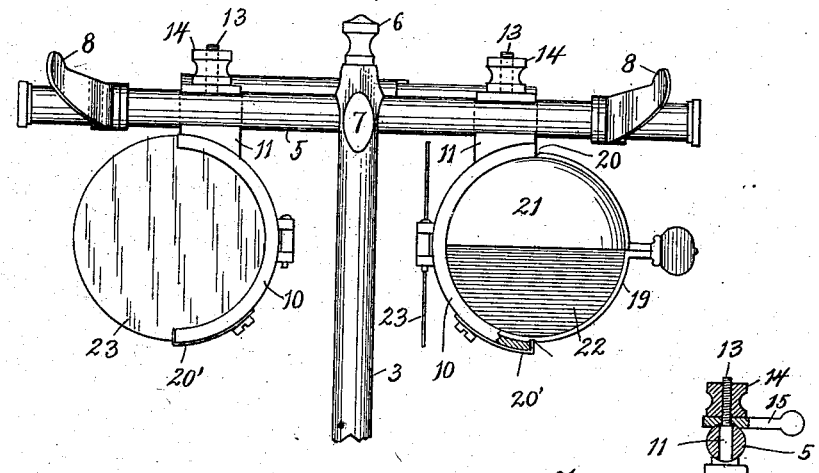
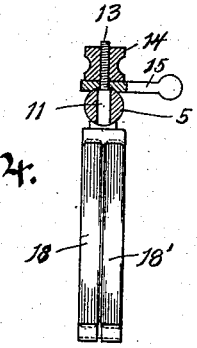
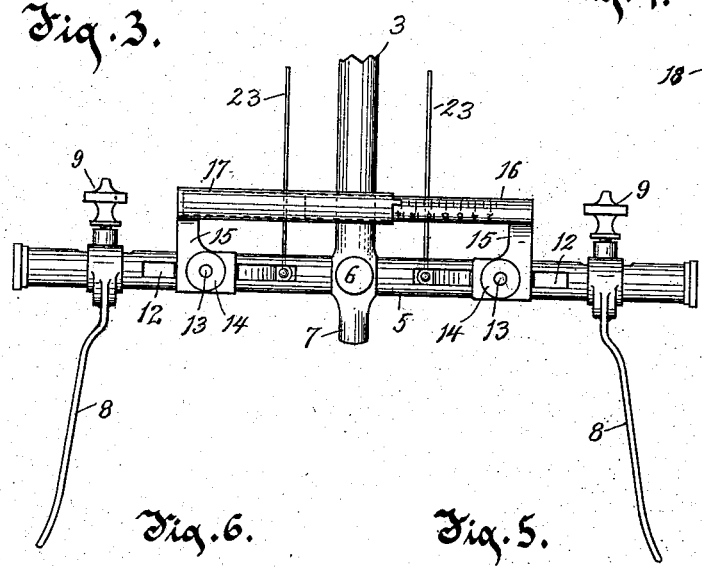
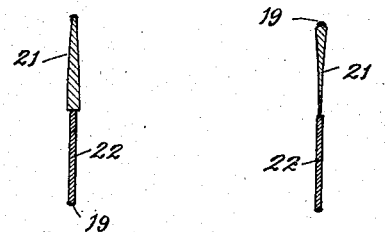
Witnesses:
Inventor.
Eugene W. Beebe
By Benedict & Morsell
Attorneys.

United States Patent Office.

EUGENE W. BEEBE, OF MILWAUKEE, WISCONSIN.

OPTICAL APPARATUS.

SPECIFICATION forming part of Letters Patent No. 721,773, dated March 3, 1903.

Application filed March 14, 1901. Serial No. 51,068. (No model.)

*To all whom it may concern:*

Be it known that I, EUGENE W. BEEBE, of Milwaukee, in the county of Milwaukee and State of Wisconsin, have invented a new and useful Improvement in Optical Apparatus, of which the following is a description, reference being had to the accompanying drawings, which are a part of this specification.

My invention relates to an improved optical apparatus by means of which greater facility and more satisfactory results are obtained than have heretofore been secured, especially in ascertaining with rapidity and exactness the proper positions in the frame for lenses adapted to the eyes of the wearer.

My invention consists of the apparatus, its parts, and combinations of parts, as herein described and claimed, and the equivalents thereof.

In the drawings, Figure 1 is a side elevation of my improved optical apparatus. Fig. 2 is a front elevation of the optical-medium holders and parts having close relation thereto. Fig. 3 is a top plan view of substantially the same parts of the apparatus as are shown in elevation in Fig. 2. Fig. 4 is an edge view of an optical-medium holder, parts in connection therewith being shown in section. Figs. 5 and 6 are transverse vertical sections, respectively, through a concave and a convex lens with a plain glass therewith, illustrating the forms and manner of using of optical mediums in connection with my apparatus. Fig. 7 is a detail of the lower extremity of the object-holding standard with the base-rail in cross-section. Fig. 8 is a top plan view of the object-holder. Fig. 9 shows a fragment of a card employed with my improved apparatus, on which a broken and offset vertical line is shown, illustrating a result of vision through an improperly-located lens. Fig. 10 shows a fragment of the same card shown in Fig. 9 with a straight vertical line thereon, illustrating the result of vision through a properly-located lens. Fig. 11 shows a fragment of a card with a plurality of vertical lines thereon, illustrating a modification of cards that may be employed with my improved apparatus.

In the drawings, 1 is a foot or base of any suitable form, in which a standard, preferably in two parts 2 and 3, is supported in upright position, the section 3 being preferably made to telescope in the section 2 and in which it is held adjustably by the clamping-screw 4, securing divided parts of the section to each other. The upper portion of the section 3 is preferably bent forward somewhat, and a cross-bar 5 is secured thereto conveniently by being put through a transverse aperture therefor in the section 3 and secured in place by a set-screw 6. The section 3 of the standard is advisably extended in front of the cross-bar a little distance, forming a rest 7, against which in use the forehead of the patient may rest centrally a little above the eyes for securing a proper position relative to the apparatus and for steadiness of relation thereto while tests are being made. Also fingers 8 8, one on either side of the standard-section 3 and at substantially equal distances therefrom, project forwardly from the cross-bar and are formed and adapted to receive the head of the patient between them and bear slightly against the sides of the head of the patient, serving as head-guards to direct the head of the patient to a central position in front of the optical mediums and to retain the head in such central position during the making of the tests with the instrument. The fingers or head-guards 8 8 may be adjustable on the cross-bar 5 and are conveniently secured thereto by set-screws 9 9. Very slight change of position, if any, of these head-guards on the cross-bar 5 will ever be required after they have once been placed in proper position on the bar and secured thereto.

Two semicircular and reversely-disposed optical-medium holders 10 10 are mounted upright—that is, their diametrical extension is up and down—and adjustably one at each side of the standard on the cross-bar 5. For thus mounting the optical-medium holders each holder is provided with a flat shank 11, that extends upwardly through an elongated slot 12 therefor in the cross-bar and in which slot the shank of the holder is movable laterally. Each of the shanks 11 is provided with an upwardly-extending screw 13 and with a nut 14, turning thereon. The screw 13 passes through a laterally-projecting arm 15, which is secured in place by the nut 14 turning on the screw against the arm and clamping it and the holder to the cross-bar releasably. One of the arms 15 is provided with a scale-arm 16, extending parallel with the cross-bar 5, and provided with a scale thereon with division-lines and numerals, and the other arm 15 is provided with an index-arm 17, also parallel with the cross-bar 5 and advisably made hollow, so that the scale-arm telescopes therein. A terminal finger on this index-arm points to and indicates on the scale on arm 16 the distance at which the vertical centers of the optical mediums in the lens-holders are from each other in the measure of the scale, which distance is supposedly the same as the interpupilary distance of the patient. This is the distance at which the vertical centers of the lenses to be used by the patient should be located from each other in the frame in either spectacles or eyeglasses used by him.

The optical-medium holders 10 10 are each provided with a groove 18 in its inner edge, adapted to receive therein the annular frame 19 of an optical medium. As it is frequently desirable to employ a plurality of optical mediums, the medium-holders are advisedly provided with a second groove 18', so that two optical-medium frames with their optical mediums therein can be placed in the holder at the same time at will. For securing the bow or frame 19 releasably in a holder 10 I provide a stationary catch 20 and a spring-catch 20', fixed opposite each other on the holder 10 and adapted to take into notches in the frame 19, and thereby retain the frame 19 releasably in the holder. To insert the frame 19 in a medium-holder 10, the frame 19 is pushed horizontally into the holder, and catch 20' yielding sufficiently to let the frame come to its seat in the holder the catch 20 enters its notch in the frame 19 and the spring-catch 20' enters its notch in frame 19, thereby engaging the frame releasably and holding it in engagement with the opposite catch 20. With this apparatus a semicircular or half lens 21 of such character (either concave or convex, as shown in Figs. 5 and 6) and of such strength as the patient requires is employed in connection with a complementary abutting plain-glass optical medium 22, both secured in the frame 19 and so disposed that their straight abutting edges are substantially in a horizontal line. The plain glass 22 is preferably slightly colored, advisably blue, so as to clearly mark the line of the junction of the plain glass 22 with the lens 21 in the field of vision of the patient. In use it is convenient to have a considerable number of frames 19 with lenses and plain-glass mediums therein in which the lenses are of such different strengths and character as may be required by different patients for ready use in connection with my apparatus. As it will frequently be necessary to make tests with one eye only of the patient, and as it is desirable that the vision of the other eye of the patient shall be obstructed to prevent any distraction by what that eye might see, and as many patients do not readily completely close one eye when the other is open, I provide an opaque blind 23 with each holder 10, which is advisably made of thin sheet metal of substantially the same size and form as the optical-medium frame 19, which blind is hinged to the medium-holder 10 so as to be capable of being swung in front of the eye of the patient or to be swung away from the field of vision.

In connection with the foregoing-described apparatus there is a base-rail 24, secured to the base 1 and extending rearwardly therefrom and provided with a foot-piece 25, adapted to support its rear extremity. This rail is provided with a scale 26, advisably divided into inches, and an object-holding standard 27 is supported upright and slidable on the rail 24, and its distance from the front standard is indicated by the scale 26. This standard 27 is held adjustably on the rail 24 by a set-screw 28. With my improved apparatus it is desirable to employ in tests for reading an object having a vertical line to be looked at by the patient, and I preferably for this purpose employ a card 29, having a central vertical line. For holding this card in place on the standard 27 I provide a frame 30, mounted on the standard 27 in such manner as to be slidable vertically thereon and secured adjustably thereto by a set-screw 31. This frame 30 is advisably constructed open at the top and with a groove in its sides and bottom adapted to receive therein one or more cards of the character of those shown in Figs. 9, 10, and 11 and in the manner shown in Fig. 8. A card with a single vertical line centrally, like the card shown in Figs. 9 and 10, is employed for ascertaining the proper distance of the optical mediums from each other for reading and with the object-holder at a distance of substantially fourteen inches from the optical mediums. A card with two vertical lines thereon at a distance apart substantially equal to the distance between the vertical centers of the optical mediums when used for reading is employed with the object-holder located at substantially fourteen inches from the optical mediums for determining the proper distances between the lenses for seeing at a distance or for distant use. In the use of this instrument it is desirable that the lens-holders and optical mediums therein be set at an oblique angle to the perpendicular, substantially as shown in Fig. 1, so that the optical mediums, especially the lenses, will be at least approximately in the position with reference to the eyes of the patient and the object that the lenses of spectacles or eyeglasses will be when in use with reference to the eyes of the patient and the book in which he is reading. The adjustment of the optical-medium holders to the proper oblique angle is provided for in and by the rotatable adjustment permitted of the cross-bar on the standard.

In making tests with my improved optical apparatus for ascertaining the proper location or distance between the lenses required by a patient the standard 27 is first adjusted at the normal focal distance for reading—about fourteen inches from the optical mediums in the standard on base 1. The medium-holders 10 are adjusted to proper oblique position to the perpendicular, which is adjusted at the proper height with reference to the optical mediums, a little lower than the optical mediums when the apparatus stands on a table or other horizontally-disposed support. An optical-medium frame 19, containing a lens 21 of the proper character and strength and a plain colored glass 22, is placed in one of the lens-holders 10, and the patient is required to place his head between the guards 8 and his forehead against the rest 7 and look with one eye through the optical medium at the junction of the lens and plain glass centrally thereof at a card 29, having a single central vertical line, in the object-holder 30. The other eye should be closed, or the blind 23 should be swung in front of that eye to cut off the field of vision therefrom. On thus looking at the card 29 with the single vertical line if the optical medium is in a proper position the vertical line will appear to be straight and continuous, as it exists on the card when observed through both the lens and plain glass of the optical medium; but if the optical medium is at one side, either at the right or left of the proper position, the vertical line on the card will appear to be broken and offset at the plane of the field of vision through the lens 21 and the plain glass 22, and in such case the lens-holder 10 must be moved laterally in the bar 5 to such position that the patient will see only the complete continuous vertical line on the card. When this position is obtained, the lens-holder is to be secured to the cross-bar by turning down the nut 14, binding the medium-holder rigidly to the cross-bar. Thereupon a similar test is made with the other eye through its proper optical medium placed in the other medium-holder, the blind being turned away from the field of vision and the blind in front of the other eye being turned across the field of vision. When the optical medium has been adjusted in front of this second eye so as to secure a correct appearance of the vertical line, the proper distance between the central vertical lines of the lenses to be employed by the patient will be indicated by the finger of the arm 17 on the scale on arm 16.

For testing the eyes of a patient with this apparatus for seeing at a distance a card having two vertical lines thereon of the character of the card shown in Fig. 11 is employed. On the card thus employed the two lines should be at a distance apart substantially equal to the distance between the central vertical lines of the lenses to be used by the patient, or, in other words, substantially equal to the interpupilary distance of the eyes of the patient when observing distant objects.

What I claim as my invention is—

1. In an optical apparatus, a standard, a cross-bar mounted rotatively and thereby adjustably in the standard and extending laterally in both directions to considerable distance from the standard, and optical-medium holders mounted severally one at each side of the standard directly on the cross-bar and adjustable laterally thereon toward and from each other, the medium-holders being in a radial plane of the cross-bar and adjustable to different angles in radial planes of the cross-bar by the rotation thereof about its longitudinal axis.

2. In optical apparatus, a standard, a cross-bar mounted revolubly in and projecting laterally in both directions considerably from the standard, optical mediums mounted directly on the cross-bar in a radial plane thereof one at each side of the standard, and guards on the cross-bar one at each side of the standard projecting from the cross-bar in a radial plane thereof and substantially at a right angle to the plane of the optical mediums, and revoluble with the cross-bar and the optical mediums about the long axis of the cross-bar.

3. In combination in optical apparatus, a standard, a cross-bar supported centrally and revolubly adjustable on the standard, semicircular upright optical-medium holders provided with shanks extending upwardly through and slidable laterally in slots therefor in the cross-bar, and means for securing the holders in place releasably on the cross-bar.

4. In combination in optical apparatus, a standard, a cross-bar adjustable revolubly on the standard, semicircular upright optical-medium holders provided with flat shanks slidable laterally in slots therefor in the cross-bar, a scale-arm and an index-arm respectively on one of said holders, and means adapted to clamp said holders and arms releasably to the cross-bar.

5. In optical apparatus, an optical medium comprising, a lens having a straight edge, a plain glass having a straight edge abutting against the straight edge of the lens, and a frame in which the lens and the plain glass are held.

6. In optical apparatus, an optical medium comprising a lens having a straight edge, a plain colored glass having a straight edge abutting against the straight edge of the lens, and a frame in which the lens and the plain glass are held.

7. In optical apparatus, a supporting-frame, and an optical medium therein comprising a plain glass and a lens so joined to each other as to form a straight line of demarcation between the plain glass and the lens across the field of vision centrally.

In testimony whereof I affix my signature in presence of two witnesses.

EUGENE W. BEEBE.

Witnesses:
 C. T. BENEDICT,
 ANNA V. FAUST.